(12) United States Patent
Oishi et al.

(10) Patent No.: US 7,546,193 B2
(45) Date of Patent: Jun. 9, 2009

(54) VEHICLE OCCUPANT PROTECTION APPARATUS AND INITIATION METHOD TO USE FOR VEHICLE OCCUPANT PROTECTION APPARATUS

(75) Inventors: Mineyuki Oishi, Tokyo (JP); Takashi Nakano, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 716 days.

(21) Appl. No.: 11/158,341

(22) Filed: Jun. 22, 2005

(65) Prior Publication Data

US 2006/0009895 A1  Jan. 12, 2006

(30) Foreign Application Priority Data

Jul. 12, 2004  (JP) ............................. 2004-204078
Aug. 4, 2004  (JP) ............................. 2004-227434

(51) Int. Cl.
*B60R 22/00* (2006.01)
*B60R 21/00* (2006.01)

(52) U.S. Cl. ......................... 701/45; 701/70; 280/735; 180/282

(58) Field of Classification Search ......... 280/736–737, 280/740–742, 743.1, 734–735; 701/45, 300–301, 701/70; 180/282; 307/10.1; 340/669
See application file for complete search history.

(56) References Cited

U.S. PATENT DOCUMENTS

| 5,233,530 A | * | 8/1993 | Shimada et al. ............. 701/107 |
| 5,276,624 A | * | 1/1994 | Ito et al. ....................... 701/72 |
| 5,502,432 A | * | 3/1996 | Ohmamyuda et al. ....... 340/436 |
| 5,515,276 A | * | 5/1996 | Kura et al. ..................... 701/45 |
| 5,707,077 A | * | 1/1998 | Yokota et al. ............... 280/735 |

(Continued)

FOREIGN PATENT DOCUMENTS

DE   2745620   * 11/1977

(Continued)

OTHER PUBLICATIONS

On the detection of vehicular crashes-system characteristics and architecture; Ching-Yao Chan; Vehicular Technology, IEEE Transactions on; vol. 51, Issue 1, Jan. 2002 pp. 180-193; Digital Object Identifier 10.1109/25.992078.*

(Continued)

*Primary Examiner*—Cuong H Nguyen
(74) *Attorney, Agent, or Firm*—Foley & Lardner LLP

(57) ABSTRACT

A vehicle occupant protection apparatus 1 including: a first acceleration sensor (2) for detecting acceleration of a front portion of a vehicle (10); a second acceleration sensor 3 for detecting acceleration of a central portion; a integral initiation control device (15) for issuing an integral initiation command; the first acceleration integral device (16) for obtaining a first integral acceleration value of the acceleration of the front portion based on the integral initiation command; the second acceleration integral device (17) for obtaining a second integral acceleration value of the acceleration of the central portion based on the integral initiation command; a subtraction device (18) for calculating a difference between the first and second integral acceleration values; and the initiation determining device (20) for determining a type of the collision using the deference and starting an operation of the vehicle protection device (6) based on the determined type of the collision.

11 Claims, 5 Drawing Sheets

U.S. PATENT DOCUMENTS

| | | | |
|---|---|---|---|
| 6,189,927 B1* | 2/2001 | Mossi et al. | 280/741 |
| 6,347,268 B1 | 2/2002 | Fujita et al. | |
| 6,559,557 B2* | 5/2003 | Manlove et al. | 307/10.1 |
| 7,416,210 B2* | 8/2008 | Roelleke | 280/735 |
| 2001/0043011 A1 | 11/2001 | Ugusa et al. | |
| 2005/0012312 A1* | 1/2005 | Roelleke | 280/735 |
| 2005/0184495 A1* | 8/2005 | Zerbe | 280/735 |
| 2006/0095185 A1* | 5/2006 | Oishi | 701/45 |
| 2007/0055427 A1* | 3/2007 | Sun et al. | 701/45 |
| 2007/0083311 A1* | 4/2007 | Tabe | 701/45 |
| 2007/0228703 A1* | 10/2007 | Breed | 280/735 |

FOREIGN PATENT DOCUMENTS

| | | | |
|---|---|---|---|
| EP | 0 982 199 A1 | | 3/2000 |
| GB | 2399137 A | * | 9/2004 |
| JP | 04176752 A | * | 6/1992 |
| JP | 04307348 A | * | 10/1992 |
| JP | 07096816 A | * | 4/1995 |
| JP | 08-025430 B2 | | 3/1996 |
| JP | 09277901 A | * | 10/1997 |
| JP | 09363275 | * | 12/1997 |
| JP | 10-029494 A | | 2/1998 |
| JP | 11-263188 A | | 9/1999 |
| JP | 2001-010441 A | | 1/2001 |
| JP | 2004-131084 A | | 4/2004 |
| JP | 2004318902 A | * | 11/2004 |
| JP | 2006130943 A | * | 5/2006 |

OTHER PUBLICATIONS

Accelerating Network Traffic Analytics Using Query-Driven Visualization; Bethel, E.W.; Campbell, S.; Dart, E.; Stockinger, K.; Kesheng Wu; Visual Analytics Science And Technology, 2006 IEEE Symposium On; Oct. 31, 2006-Nov. 2, 2006 pp. 115-122; Digital Object Identifier 10.1109/VAST.2006.261437.*

Decentralized cooperative collision avoidance for acceleration constrained vehicles; Hoffmann, Gabriel M.; Tomlin, Claire J.; Decision and Control, 2008. CDC 2008. 47th IEEE Conference on; Dec. 9-11, 2008 pp. 4357-4363; Digital Object Identifier 10.1109/CDC.2008.4739434.*

Decentralized reactive collision avoidance for multivehicle systems; Lalish, Emmett; Morgansen, Kristi A.; Decision and Control, 2008. CDC 2008. 47th IEEE Conference on; Dec. 9-11, 2008 pp. 1218-1224; Digital Object Identifier 10.1109/CDC.2008.4738894.*

Towards automatic detection of falls using wireless sensors; Srinivasan, S.; Jun Han; Lal, D.; Gacic, A.; Engineering in Medicine and Biology Society, 2007. EMBS 2007. 29th Annual International Conference of the IEEE; Aug. 22-26, 2007 pp. 1379-1382; Digital Object Identifier 10.1109/IEMBS.2007.4352555.*

Collision avoidance maneuver for an autonomous vehicle; Durali, M.; Javid, G.A.; Kasaiezadeh, A.; Advanced Motion Control, 2006. 9th IEEE International Workshop on; 0-0 0 pp. 249-254; Digital Object Identifier 10.1109/AMC.2006.1631666.*

Automatic adaption of sensor-based robots; Deiterding, Jan; Henrich, Dominik; Intelligent Robots and Systems, 2007. IROS 2007. IEEE/RSJ International Conference on; Oct. 29, 2007-Nov. 2, 2007 pp. 1828-1833; Digital Object Identifier 10.1109/IROS.2007.4399185.*

Prediction in Dynamic Environments for Autonomous On-Road Driving; Madhavan, R.; Kootbally, Z.; Schlenoff, C.; Control, Automation, Robotics and Vision, 2006. ICARCV '06. 9th International Conference on; Dec. 5-8, 2006 pp. 1-6; Digital Object Identifier 10.1109/ICARCV.2006.345209.*

Global Adaptive Lyapunov-Based Control of a Robot and Mass-Spring System Undergoing An Impact Collision; Dupree, K.; Liang, C.; Hu, G.; Dixon, W.E.; Decision and Control, 2006 45th IEEE Conference on; Dec. 13-15, 2006 pp. 2039-2044 Digital Object Identifier 10.1109/CDC.2006.377228.*

Collision detection and reaction: A contribution to safe physical Human-Robot Interaction; Haddadin, Sami; Albu-Schaffer, Alin; De Luca, Alessandro; Hirzinger, Gerd; Intelligent Robots and Systems, 2008. IROS 2008. IEEE/RSJ International Conference on; Sep. 22-26, 2008 pp. 3356-3363; Digital Object Identifier 10.1109/IROS.2008.4650764.*

The effects of deactivation and (re)activation of ACC on driver behaviour analyzed in real traffic; Pauwelussen, J.; Minderhoud, M.; Intelligent Vehicles Symposium, 2008 IEEE; Jun. 4-6, 2008 pp. 257-262; Digital Object Identifier 10.1109/IVS.2008.4621309.*

A Robot Collision Avoidance Scheme Based on the Moving Obstacle Motion Prediction; Rongxin Jiang; Xiang Tian; Li Xie; Yaowu Chen; Computing, Communication, Control, and Management, 2008. CCCM '08. ISECS International Colloquium on vol. 2, Aug. 3-4, 2008 pp. 341-345; Digital Object Identifier 10.1109/CCCM.2008.347.*

A sensor based assessment of imminent collisions at right angle intersections; Streib, Kevin; Ozguner, Umit; Martin, John; Yutaka Mochizuki,; Kei Ishikawa,; Vehicular Electronics and Safety, 2008. ICVES 2008. IEEE International Conference on Sep. 22-24, 2008 pp. 210-215; Digital Object Identifier 10.1109/ICVES.2008.4640885.*

* cited by examiner

VEHICLE OCCUPANT PROTECTION APPARATUS AND INITIATION METHOD TO USE FOR VEHICLE OCCUPANT PROTECTION APPARATUS

BACKGROUND OF THE INVENTION

1. Field of the Invention

The present invention relates to a vehicle occupant protection apparatus for protecting a vehicle occupant by controlling an operation of an occupant protection device (e.g. an airbag apparatus) according to a type of collision while a vehicle is colliding, and an initiation method to use for the vehicle occupant protection apparatus.

2. Description of Related Art

Conventionally, there is known a vehicle occupant protection apparatus for determining greatness of collision velocity by using a change in acceleration with time (a time-integrated value of acceleration and a time-differentiated value of acceleration) detected by a single acceleration sensor (for reference, see Japanese Patent Laid-Open No. H10-29494).

In the above apparatus, each of two inflators is not driven when the collision velocity is notably small, and only a first inflator is driven to half unfold an airbag (to inflate an airbag with a low pressure) when the collision velocity is medium, and further, after the first inflator is driven a second inflator is driven to fully unfold the airbag (to inflate the airbag with a high pressure) when the collision velocity is great.

Also, there is known a vehicle occupant protection apparatus which detects deceleration with a single acceleration sensor, then calculates a first integrated value which is a time integrated value of the deceleration, then calculates a second integrated value by taking the time-integral of the first integrated value, then adds a weight value to each of the first integrated value and the second integrated value, and then drives an airbag by estimating movement of a vehicle occupant using the calculated sum (for reference, see Japanese Patent Publication No. H08-25430)

It is proposed that a vehicle occupant protection apparatus detects acceleration with a single acceleration sensor thereof, then calculates acceleration, greatness of the acceleration, change in acceleration with time and a reduced quantity of velocity with a control circuit thereof, then estimates a scale of an impact by using those calculated values, and then drives each inflator according to the estimated scale (for reference, see Japanese Patent Laid-Open No. 2004-131084).

It is also proposed that an initiation control apparatus for use on a vehicle occupant protection apparatus detects deceleration of a vehicle with a single acceleration sensor thereof, then calculates a integral velocity value, which is a time integrated value of the deceleration, then detects when the integral velocity value exceeds a first predetermined threshold value and initiates a first inflator, and then initiates a second inflator at the time the integral velocity exceeds a second predetermined threshold value, so that the second inflator can be driven without fault in the case the time integrated value of the deceleration delays in responding after the first inflator is driven in an offset collision, by improving arithmetic calculation process (for reference, see Japanese Patent Laid-Open No. H11-263188).

Normally, when protecting a vehicle occupant from a collision impact by way of unfolding an airbag, since the time for inflating an airbag should be considered, a type of the collision needs to be determined until 30 milliseconds (0.03 seconds) before the impact of the collision which may damage the occupant applies to the occupant to inflate the airbag according to the type of the collision.

That is, as described in H11-263188, there is a case where an airbag is fully unfolded (is inflated with a high pressure), and there is another case where the airbag is half unfolded (is inflated with a low pressure), according to the type of a collision.

However, in the vehicle occupant protection apparatus described in H11-263188, if the first and second threshold values are predetermined in order to drive the first inflator when a low velocity head-on collision occurred and to drive the first and second inflator when a high velocity head-on collision occurred, then there may rise a case where the integrated value of the acceleration exceeds the first threshold value but does not exceed the second threshold value when a high velocity oblique collision or a high velocity offset collision occurs, and in such a case the second inflator may not be driven.

FIG. 5 is a graph showing the problem described above. The lateral axis designates elapsed time from the beginning of a collision occurs, and the vertical axis designates integrated values of acceleration (time integrated values from the time collision occurs) detected with an acceleration sensor. The acceleration sensor may be attached either to an anterior-end portion of a vehicle or to a substantially central portion of the vehicle. In the graph "th1" designates a threshold value for initiating the first inflator and "th2" designates a threshold value for initiating the second inflator. The symbol "a" designates a characteristic of change in the integrated value in the case where a head-on collision occurs at a low velocity (e.g. 26 kilometer/hour). The symbol "b" designates a characteristic of change in the integrated value in the case where a head-on collision occurs at a high velocity (e.g. 35 kilometer/hour). The symbol "c" designates a characteristic of change in the integrated value in the case where an offset/oblique collision occurs at a high velocity (e.g. an offset collision at 64 kilometer/hour or an oblique collision at 40 kilometer/hour). As indicated with the symbol "c", in a high velocity offset collision or a high velocity oblique collision there might occur the case where the integrated value of the acceleration exceeds the first threshold value th1 but does not exceed the second threshold value th2, and in such a case the second inflator may not be driven. Further, in the case where a high velocity offset collision or a high velocity oblique collision occurs, it might take time for the integrated value of acceleration to reach the second threshold value, thus the timing for initiating the second inflator might not be proper. Further to this, another vehicle occupant protection apparatus is described in Japanese Patent Laid-Open No. 2001-10441.

SUMMARY OF THE INVENTION

Thus, an object of the present invention is to provide a vehicle occupant protection apparatus and an initiation method to use for the vehicle occupant protection apparatus capable of more properly initiating a vehicle occupant protection device according to a collision type by determining the collision type when a vehicle collides.

According to one aspect of the present invention, a vehicle occupant protection apparatus comprises: a first acceleration sensor, attached to a front portion of a vehicle, for detecting acceleration in the vehicle's longitudinal direction; a second acceleration sensor, attached to a substantially central portion in the vehicle's longitudinal direction, for detecting acceleration in the vehicle's longitudinal direction; an integral initiation control device for issuing an integral initiation command at the time acceleration detected by the first acceleration sensor exceeds a preset threshold value for determining whether a collision of the vehicle is occurring; a first acceleration integral device for obtaining a first integral acceleration value by taking the time integral of acceleration detected by the first acceleration sensor based on the integral initiation command from the integral initiation control device; a second acceleration integral device for obtaining a second integral acceleration value by taking the time integral of acceleration detected by the second acceleration sensor based on the integral initiation command from the integral initiation control device; a subtraction device for calculating a difference between the first integral acceleration value and the second integral acceleration value; and an initiation determining device for determining a type of the collision using the difference calculated by the subtraction device and starting an operation of a vehicle protection device a protecting a vehicle occupant of the vehicle based on the determined type of the collision.

The present application claims the benefit of priority to Japan Patent Application Nos. JP2004-227434, filed on Aug. 4, 2004 and 2004-204078, filed on Jul. 12, 2004, which are hereby incorporated by reference.

BRIEF DESCRIPTION OF THE DRAWINGS

For a better understanding of the invention, reference is made to the attached drawings, wherein.

DETAILED DESCRIPTION OF THE PREFERRD EMBODIMENTS

Preferred embodiments of the present invention will be explained below by referring to the accompanying drawings.

A First Embodiment of the Present Invention

Figure 1:
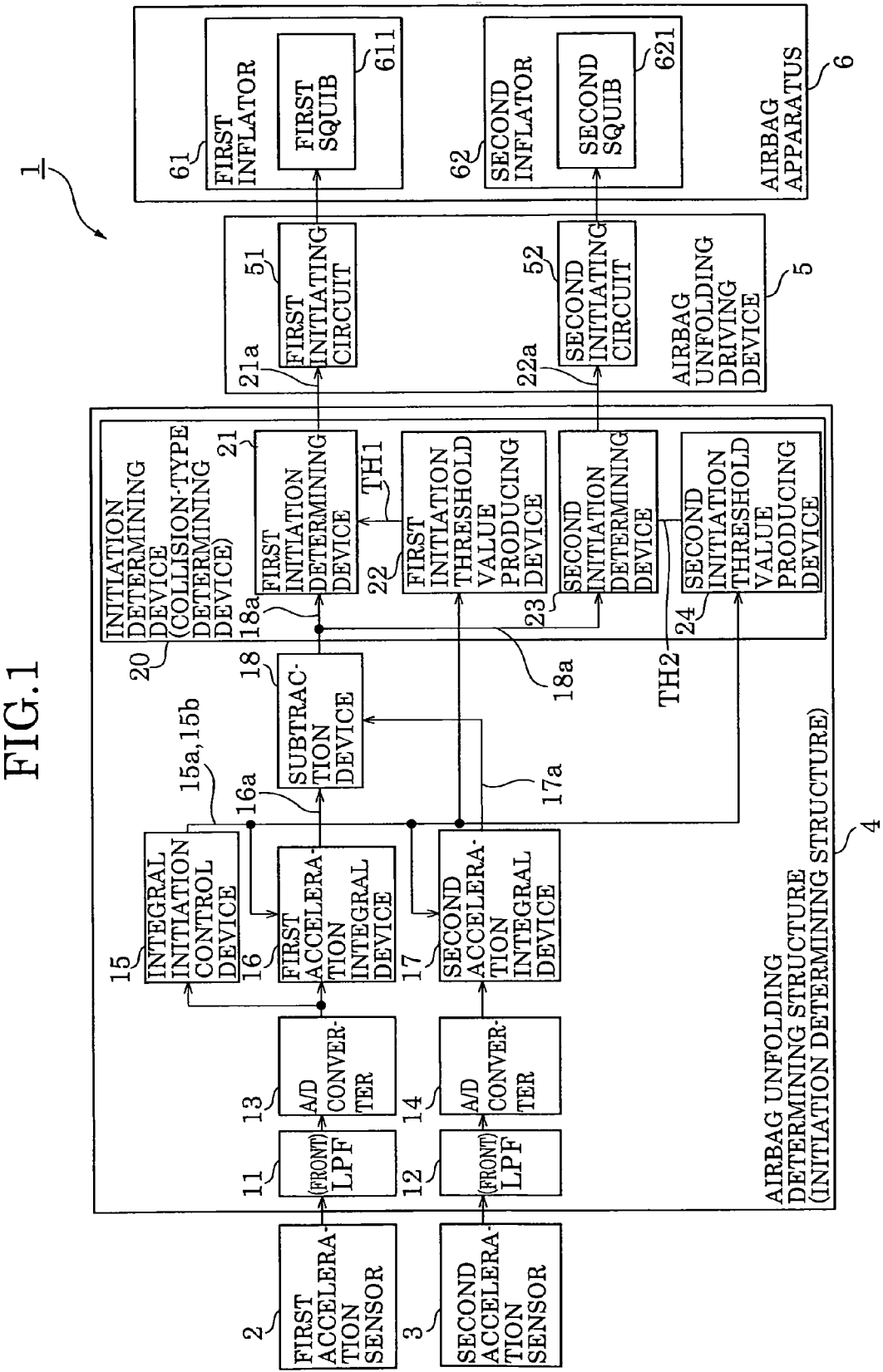
FIG. 1 is a block diagram showing a vehicle occupant protection apparatus of embodiments according to the present invention.

FIG. 1 is a block diagram showing a vehicle occupant protection apparatus of the first embodiment according to the present invention. The vehicle occupant protection apparatus 1 according to the present invention includes a first acceleration sensor (front acceleration sensor) 2, a second acceleration sensor (central acceleration sensor) 3, an airbag unfolding determining structure 4 as an initiation determining structure, an airbag unfolding driving device 5 as a driving device, and an airbag apparatus 6 as a vehicle occupant protection device.

The first acceleration sensor 2 is attached to a substantially center of a front portion (nearby a radiator grille, for example) of a vehicle. The first acceleration sensor 2 detects acceleration of the vehicle in a longitudinal direction (vehicle's longitudinal acceleration) and outputs a detected acceleration output signal.

The second acceleration sensor 3 is attached to a substantially center of the vehicle both in a longitudinal direction and in a lateral direction (e.g. a floor tunnel portion or a floor face close to a shift lever in the vehicle). This second acceleration sensor 3 does not need be located in an exact center of the vehicle in the longitudinal direction, and may be located in a portion closer to the center in the vehicle's longitudinal direction than a portion to which the first acceleration sensor 2 is attached. Preferably, the second acceleration sensor 3 is attached to a portion located in a vehicle occupant area (i.e. an inside, an upside or a lower part of a vehicle occupant room).

In this embodiment, the first acceleration sensor 2 and the second acceleration sensor 3 output a positive (+) value for indicating acceleration tending to slow down the vehicle (i.e. deceleration) and a negative (−) value for indicating acceleration tending to speed up the vehicle in the case where output voltage is set to zero (0) while no acceleration is applied thereto.

The airbag unfolding determining structure 4 is provided with LPFs (law-pass filter) 11, 12, A/D converters 13, 14, an integral initiation control device 15, a first acceleration integral device 16, a second acceleration integral device 17, a subtraction device 18, a first initiation determining device 21, a first initiation threshold value producing device 22, a second initiation determining device 23, and a second initiation threshold value producing device 24. In this embodiment, the first and second initiation determining devices 21, 23 and the first and second initiation threshold value producing devices 22, 24 constitute an initiation determining device 20 as set forth in the claims.

With the LPF 11, a high-frequency noise component is removed and a low-frequency component in response to a vehicle collision is abstracted from the detected acceleration output signal from the first acceleration sensor 2, and then the abstracted low-frequency component is provided for the A/D converter 13 to be converted into a digital signal. Further, a high pass filter (not shown) may be employed in a previous step of the LPF 11, so that an influence of drift current of output voltage from the first acceleration sensor 2 can be excluded. A front acceleration digital signal (front acceleration data) outputted from the A/D converter 13 is provided for the integral initiation control device 15 and the first acceleration integral device 16.

The integral initiation control device 15 continuously monitors the front acceleration (acceleration of the anterior portion of the vehicle) based on the front acceleration digital signal (front acceleration data), and issues an integral initiation command 15a at the time the front acceleration exceeds a preset collision determining threshold value (e.g. 2 to 4 G (about 19.6 to 39.2 m/sec$^2$)). Also, the integral initiation control device 15 issues a reset command 15b when the front acceleration remains under the preset collision determining threshold value (e.g. 2 to 4 G (about 19.6 to 39.2 m/sec$^2$)) for a preset time (e.g. 100 millisecond). The integral initiation command 15a is provided for the first acceleration integral device 16, the second acceleration integral device 17, the first initiation threshold value producing device 22, and the second initiation threshold value producing device 24, respectively. The reset command 15b is provided for the first acceleration integral device 16 and the second acceleration integral device 17, respectively.

The first acceleration integral device 16 starts time-integrating the front acceleration at the time the integral initiation command 15a is provided, based on the front acceleration digital signal (front acceleration data). The first acceleration integral device 16 continues taking the time integral of the front acceleration until the reset command 15b is provided therefor, and clears the integrated value to zero at the time the reset command 15b is provided therefor. The time integrated value of the acceleration of the front portion (first acceleration integrated value) is provided for the subtraction device 18.

With the LPF 12 a high-frequency noise component is removed from and a low-frequency component in response to a vehicle collision is abstracted from the detected acceleration output signal outputted from the second acceleration sensor 3, and then the abstracted low-frequency component is provided for the A/D converter 14 to be converted into a digital signal. Further, a high pass filter (not shown) may be employed in a previous step of the LPF 12, so that an influence of drift current of output voltage from the second acceleration sensor 3 can be excluded. A central acceleration digital signal (central acceleration data) is provided for the second acceleration integral device 17.

The second acceleration integral device 17 starts time-integrating of the central acceleration at the time the integral initiation command 15a is provided therefor, based on the central acceleration digital signal (central acceleration data). The second acceleration integral device 17 continues taking the time integral of the central acceleration until the reset command 15b is provided therefor, and clears the integrated value to zero at the time the reset command 15b is provided therefor. The time integrated value of the acceleration of the central portion (second acceleration integrated value) is provided for the subtraction device 18.

The subtraction device 18 subtracts the time integrated value of the acceleration of the central portion (second acceleration integrated value) from the time integrated value of the acceleration of the front portion (first acceleration integrated value) and outputs the difference of them. The difference outputted from the subtraction device 18 is provided for the first initiation determining device 21 and the second initiation determining device 23, respectively.

The first initiation threshold value producing device 22 generates a first initiation threshold value TH1 predetermined in accordance with elapsed time from receipt of the integral initiation command 15a. This first initiation threshold value TH1 is provided for the first initiation determining device 21.

The first initiation determining device 21 compares the difference obtained by subtracting the time integrated value of the acceleration of the central portion (second acceleration integrated value) from the time integrated value of the acceleration of the front portion (first acceleration integrated value) with the first initiation threshold value TH1, and outputs a first initiation command at the time the difference exceeds the first initiation threshold value TH1.

The second initiation threshold value producing device 24 generates a second initiation threshold value TH2 predetermined in accordance with elapsed time from receipt of the integral initiation command 15a. This second initiation threshold value TH2 is provided for the second initiation determining device 23.

The second initiation determining device 23 compares the difference obtained by subtracting the time integrated value of the acceleration of the central portion (second acceleration integrated value) from the time integrated value of the acceleration of the front portion (first acceleration integrated value) with the second initiation threshold value TH2, and outputs a second initiation command at the time the difference exceeds the second initiation threshold value TH2.

The first initiation threshold value TH1 is set in order that a low velocity collision can be detected thereby. The second initiation threshold value TH2 is greater than the first initiation threshold value TH1 and is set in order that a high velocity collision can be detected thereby.

The airbag apparatus 6 is a two-step type having the first inflator 61 and the second inflator 62, and is provided with each gas generating material (not shown) initiated by first and second squibs 611, 621, a bag (not shown) inflated with the generated gas, and so forth.

The airbag unfolding driving device 5 is provided with a first initiating circuit 51 for initiating the first squib 611 by applying currency, based on the first initiation command, and a second initiating circuit 52 for initiating the second squib 621 by applying currency, based on the second initiation command.

In this connection, when the difference does not exceed the second initiation threshold value TH2 for a predetermined time (e.g. 100 millisecond) from the time the first initiation command is outputted from the first initiation determining device 21, the second initiation determining device 23 may be configured to output the second initiation command (forcible initiation command) at the time a predetermined time (e.g. 100 millisecond) elapses from the time the first initiation command is outputted. By so doing, unconsumed explosive does not remain after completion of an operation of the airbag apparatus 6. Further, the forcible initiation command may not be outputted from the second initiation determining device 23, instead, the second initiating circuit 52 may be configured to output the forcible initiation command.

Figure 2:
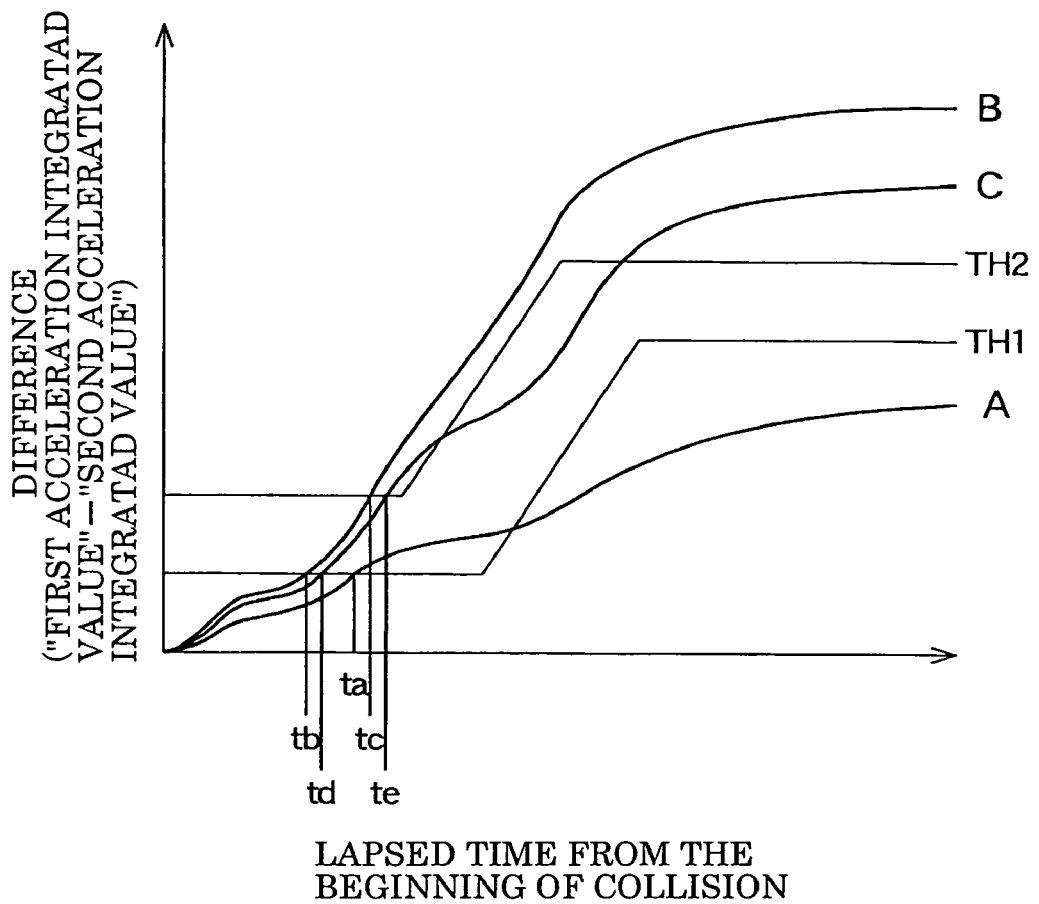
FIG. 2 is a graph for describing an operation of a vehicle occupant protection apparatus of a first embodiment according to the present invention.

FIG. 2 is a graph for describing an operation of a vehicle occupant protection apparatus of the first embodiment according to the present invention. The lateral axis designates elapsed time from when the integral initiation command 15a is outputted from the integral initiation control device 15 (elapsed time from the time a collision occurred). The vertical axis designates the difference, which is an output from the subtraction device 18 (i.e. the first acceleration integrated value minus (−) the second first acceleration integrated value). A symbol "TH1" designates the first initiation threshold value produced by the first initiation threshold value producing device 22, a symbol "TH2" designates the second initiation threshold value produced by the second initiation threshold value producing device 24.

A symbol "A" designates a characteristic of change in the difference in the case where a head-on collision occurs at a low velocity (e.g. a head-on collision (full-wrap collision) at 26 kilometer/hour). In a low velocity head-on collision, the difference exceeds the first initiation threshold TH1 at the point "ta", and at this point the first initiation command is outputted from the first initiation determining device 21 to the first squib 611 via the first initiating circuit 51, initiating the first squib 611, thereby the first inflator is initiated and the airbag is half unfolded (is inflated with a low pressure). Since the difference in a low velocity head-on collision does not exceed the second initiation threshold value TH2, the second initiation command responsive to the second initiation threshold value TH2 is not produced. Alternatively, the forcible initiation command is produced at the time the predetermined time (e.g. 100 millisecond) elapses from the time the first initiation command is outputted, initiating the second inflator 62 to fully unfold the airbag (to inflate the airbag with a high pressure).

The symbol "B" designates a characteristic of change in the difference in a high velocity head-on collision (e.g. a head-on collision (full-wrap collision) at 35 kilometer/hour). In a high velocity head-on collision, the difference exceeds the first initiation threshold TH1 at the point "tb", and at this point the first initiation command is outputted from the first initiation determining device 21, then the airbag is half unfolded (is inflated with a low pressure). Further, the difference exceeds the second initiation threshold TH2 at the point "tc", and at this point the second initiation command is outputted from the second initiation determining device 23 to the second squib 621 via the second initiating circuit 52, the second squib 621 is initiated, the second inflator 62 is initiated, and the airbag is fully unfolded (is inflated with a high pressure).

The symbol "C" designates a characteristic of change in the difference in a high velocity offset collision (e.g. an offset collision at 64 kilometer/hour) or a high velocity oblique collision (e.g. an oblique collision at 40 kilometer/hour). In a high velocity offset collision or a high velocity oblique collision the difference exceeds the first initiation threshold TH1 at the point "td", and at this point the first initiation command is outputted from the first initiation determining device 21, then the airbag is half unfolded (is inflated with a low pressure). Further, the difference exceeds the second initiation threshold TH2 at the point "te", and at this point the second initiation command is outputted from the second initiation determining device 23, and the airbag is fully unfolded (is inflated with a high pressure).

Thus, by comparing the difference (i.e. the first acceleration integrated value minus (−) the second first acceleration integrated value) with each initiation threshold value TH1, TH2, it is surely determined which collision is occurring, a low velocity head-on collision, which produces relatively low impact, where the second inflator 62 is not necessarily initiated, or a high velocity collision, which produces relatively high impact, where the second inflator 62 need be initiated, and moreover, the second inflator 62 can be initiated at proper timing in response to a degree of impact to half-unfold the airbag (to inflate the airbag with a high pressure).

As described above, the vehicle occupant protection apparatus 1 according to the present invention includes: the first acceleration sensor 2, attached to the front portion of the vehicle 10, for detecting acceleration in the vehicle 10's longitudinal direction; the second acceleration sensor 3, attached to the substantially central portion in the vehicle 10's longitudinal direction, for detecting acceleration in the vehicle 10's longitudinal direction; the integral initiation control device 15 for issuing an integral initiation command at the time acceleration detected by the first acceleration sensor 2 exceeds the preset threshold value for determining whether a collision of the vehicle 10 is occurring; the first acceleration integral device 16 for obtaining a first integral acceleration value by taking the time integral of acceleration detected by the first acceleration sensor 2 based on the integral initiation command from the integral initiation control device 15; the second acceleration integral device 17 for obtaining a second integral acceleration value by taking the time integral of acceleration detected by the second acceleration sensor 3 based on the integral initiation command from the integral initiation control device 15; the subtraction device 18 for calculating a difference between the first integral acceleration value and the second integral acceleration value; and the initiation determining device 20 for determining a type of the collision using the deference calculated by the subtraction device 18 and starting an operation of the airbag apparatus (vehicle protection device) 6 for protecting a vehicle occupant of the vehicle 10 based on the determined type of the collision.

The vehicle occupant protection apparatus 1 obtains a difference by subtracting a second acceleration integrated value obtained by taking the time integral of an output from the second acceleration sensor 3 from a first acceleration integrated value obtained by taking the time integral of an output from the first acceleration sensor 2 located in an anterior portion of the vehicle 10, and judges initiation of the first and second inflators 61, 62 based on the difference. Thus, the second inflator 62 can be surely initiated at proper timing not only in a high velocity head-on collision but also in a high velocity offset/oblique collision.

A Second Embodiment of the Present Invention

The second embodiment according to the present invention is, like the first embodiment, shown in the block diagram of FIG. 1. The vehicle occupant protection apparatus 1 according to the present invention is provided with a first acceleration sensor (front acceleration sensor) 2, a second acceleration sensor (central acceleration sensor) 3, an airbag unfolding determining structure 4, an airbag driving device 5, and an airbag apparatus 6.

Figure 3A:
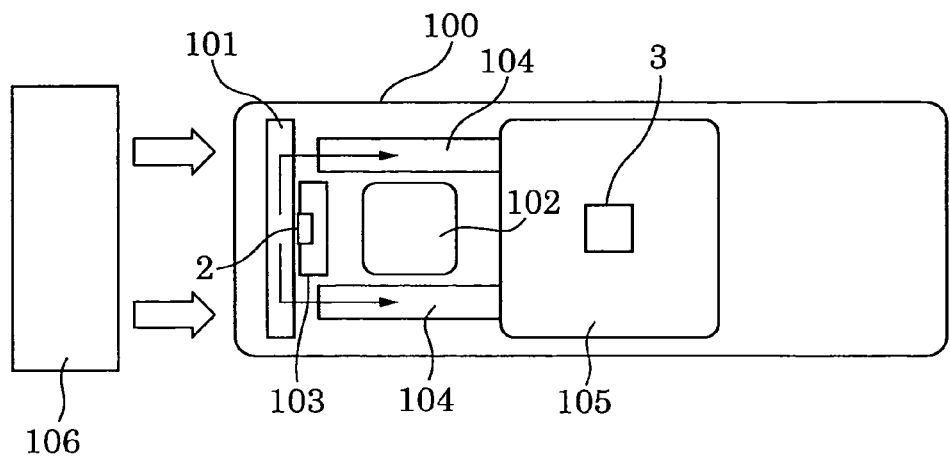
FIG. 3A is a schematic diagram exemplarily showing an experiment in a head-on collision of a vehicle.
Figure 3B:
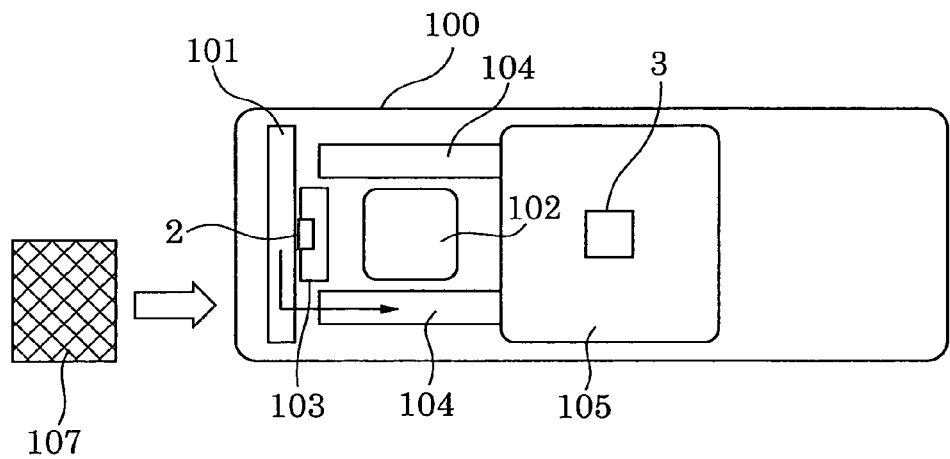
FIG. 3B is a schematic diagram exemplarily showing an experiment in an offset collision of a vehicle.
Figure 3C:
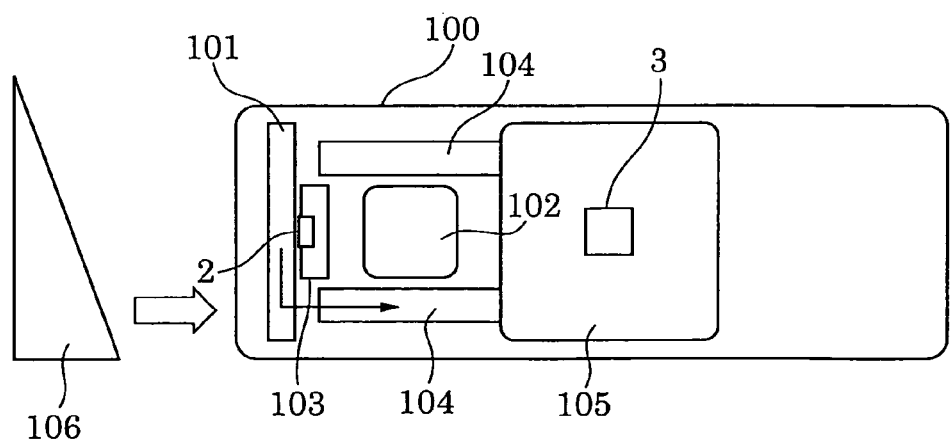
FIG. 3C is a schematic diagram exemplarily showing an experiment in an oblique collision of a vehicle.

Further, as shown in FIGS. 3A, 3B and 3C, a bumper armature 101 extending in a vehicle 100's lateral direction is located in an anterior portion of the vehicle 100, and a radiator 103 for cooling an engine 102 is located in the back of the bumper armature 101.

A couple of side members 104, 104 are respectively located in either side of the engine 102, extending in a longitudinal direction of the vehicle 100. Front ends of the side members 104, 104 are connected to the back surface of the bumper armature 101, and back ends of the side members 104, 104 are connected to a front pillar (not shown) which forms a vehicle occupant room 105.

The first acceleration sensor 2 is attached to a radiator core (not shown) which supports the radiator 103, and the second acceleration sensor 3 is located in a substantially central portion of the vehicle occupant room 105.

That is, in this embodiment, the first acceleration sensor 2 is attached to an anterior portion located in a substantially center in the vehicle 100's lateral direction. The first acceleration sensor 2 detects acceleration in the vehicle 100's longitudinal direction and outputs a detected front acceleration output signal.

The second acceleration sensor 3 is attached to a substantially center in the vehicle 100's longitudinal and lateral direction (e.g. a floor tunnel portion or a floor face close to a shift lever in the vehicle). The second acceleration sensor 3 detects acceleration in the vehicle 100's longitudinal direction and outputs a detected central acceleration output signal.

In this connection, the second acceleration sensor 3 does not have to be located in the exactly center in the vehicle 100's longitudinal direction, and may be located at least posterior to the first acceleration sensor 2.

The first acceleration sensor 2 and the second acceleration sensor 3 output a positive (+) value for indicating acceleration tending to slow down the vehicle 100 (i.e. deceleration) and a negative (−) value for indicating acceleration tending to speed up the vehicle 100 in the case where output voltage is set to zero (0) while no acceleration is applied thereto.

The airbag unfolding determining structure 4 is provided with a front LPF (law-pass filter) 11, a central LPF 12, a front A/D converter 13, a central A/D converter 14, an integral initiation control device 15, a first acceleration integral device 16, a second acceleration integral device 17, a subtraction device 18, a collision-type determining device 20 as an initiation determining device.

The front LPF 11 and the central LPF 12 remove a high-frequency noise component and abstract a low-frequency component in response to a vehicle collision, from the detected acceleration output signal inputted from the first acceleration sensor 2 and the second acceleration sensor 3 respectively.

A high pass filter (not shown) may be employed in a previous step of the front LPF 11, so that an influence of drift current of output voltage from the first acceleration sensor 2 can be excluded. Also, a high pass filter (not shown) may be employed in a previous step of the central LPF 12, so that an influence of drift current of output voltage from the first acceleration sensor 3 can be excluded.

The front A/D converter 13 and the central A/D converter 14 convert a low-frequency component according to a vehicle collision inputted via the front LPF 11 or the central LPF 12 into digital data.

A front acceleration digital signal (front acceleration data) outputted from the front A/D converter 13 is provided for the integral initiation control device 15 and the first acceleration integral device 16. A central acceleration digital signal (central acceleration data) outputted from the central A/D converter 14 is provided for the second acceleration integral device 17.

The integral initiation control device 15 continuously monitors the front acceleration (acceleration of the anterior portion of the vehicle 100) based on the front acceleration digital signal (front acceleration data), and issues an integral initiation command 15a at the time the front acceleration exceeds a preset collision determining threshold value (e.g. 2 to 4 G (about 19.6 to 39.2 m/sec$^2$)).

Moreover, the integral initiation control device 15 issues a reset command 15b when the front acceleration remains below the preset collision determining threshold value (e.g. 2 to 4 G (about 19.6 to 39.2 m/sec$^2$)) for a preset time (e.g. 100 millisecond).

The integral initiation command 15a is provided for the first acceleration integral device 16, the second acceleration integral device 17, a first initiation threshold value producing device 22 (which will be described later), and a second initiation threshold value producing device 24 (which will be described later), respectively. The reset command 15b is provided for the first acceleration integral device 16 and the second acceleration integral device 17, respectively.

The first acceleration integral device 16 starts time-integrating the front acceleration based on the front acceleration digital signal (front acceleration data) at the time the integral initiation command 15a is provided therefor. The first acceleration integral device 16 continues taking the time integral of the front acceleration until the reset command 15b is provided therefor, and clears the integrated value to zero at the time the reset command 15b is provided therefor. The time integrated value of the acceleration of the front portion (first acceleration integrated value) 16a is provided for the subtraction device 18.

The second acceleration integral device 17 starts time-integrating of the central acceleration at the time the integral initiation command 15a is provided therefor, based on the central acceleration digital signal (central acceleration data). The second acceleration integral device 17 continues taking the time integral of the central acceleration until the reset command 15b is provided therefor, and clears the integrated value to zero at the time the reset command 15b is provided therefor. The time integrated value of the acceleration of the central portion (second acceleration integrated value 17a) is provided for the subtraction device 18.

The subtraction device 18 obtains a difference 18a by subtracting the time integrated value of the acceleration of the central portion (second acceleration integrated value 17a) from the time integrated value of the acceleration of the front portion (first acceleration integrated value 16a) and outputs the difference 18a (=16a−17a). By so doing, a damping amount of acceleration which represents how much amount of acceleration is reduced within transmission of a collision impact between the first acceleration sensor 2 and the second acceleration sensor 3 can be obtained.

The difference 18a outputted from the subtraction device 18 is provided for a first initiation determining device 21 and a second initiation determining device 23 of the initiation determining device 20, respectively.

The initiation determining device 20 includes the first initiation determining device 21, the first initiation threshold value producing device 22, the second initiation determining device 23 and the second initiation threshold value producing device 24. The initiation determining device 20 determines a type of a vehicular collision by using the difference provided by the subtraction device 18.

The first initiation threshold value producing device 22 generates a first initiation threshold value TH1 predetermined in accordance with elapsed time from receipt of an integral initiation command 15a. This first initiation threshold value TH1 is provided for the first initiation determining device 21.

The first initiation determining device 21 compares the difference 18a obtained by subtracting the time integrated value of the acceleration of the central portion (second acceleration integrated value 17a) from the time integrated value of the acceleration of the front portion (first acceleration integrated value 16a) with the first initiation threshold value TH1, and outputs a first initiation command 21a at the time the difference 18a exceeds the first initiation threshold value TH1.

The second initiation threshold value producing device 24 generates a second initiation threshold value TH2 predetermined in accordance with elapsed time from receipt of the integral initiation command 15a. This second initiation threshold value TH2 is provided for the second initiation determining device 23.

The second initiation determining device 23 compares the difference 18a obtained by subtracting the time integrated value of the acceleration of the central portion (second acceleration integrated value 17a) from the time integrated value of the acceleration of the front portion (first acceleration integrated value 16a) with the second initiation threshold value TH2, and outputs a second initiation command 22a at the time the difference 18a exceeds the second initiation threshold value TH2.

The first initiation threshold value TH1 is set in order that a low velocity collision can be detected thereby. The second initiation threshold value TH2 is greater than the first initiation threshold value TH1 and is set in order that a high velocity collision can be detected thereby.

The airbag apparatus 6 is a two-step type having the first inflator 61 and the second inflator 62, and is provided with each gas generating material (not shown) initiated by a first squib 611/second squib 621, a bag (not shown) inflated with the generated gas, and so forth.

The airbag unfolding driving device 5 is provided with a first initiating circuit 51 for initiating the first squib 611 by applying currency, based on the first initiation command 21a, and a second initiating circuit 52 for initiating the second squib 621 by applying currency, based on the second initiation command 22a.

In this connection, when the difference 18a does not exceed the second initiation threshold value TH2 for a predetermined time (e.g. 100 millisecond) from the time the first initiation command is outputted from the first initiation determining device 21, the second initiation determining device 23 may be configured to output the second initiation command (forcible initiation command) at the time a predetermined time (e.g. 100 millisecond) elapses from the time the first initiation command is outputted.

By so doing, unconsumed explosive does not remain after completion of an operation of the airbag apparatus 6. The forcible initiation command may not be outputted from the second initiation determining device 23, instead, the second initiating circuit 52 may be configured to output the forcible initiation command.

The function of the vehicle occupant protection apparatus 1 according to the present invention will be described below.

In the case where the vehicle 100 as described above collides head-on with a barrier (a rigid concrete wall) 106 at a low velocity, e.g. 26 kilometer/hour, as shown in FIG. 3A, almost all area of the front surface of the vehicle 100 strikes barrier 106 vertically.

In this case, since the collision area on the vehicle 100 is large, the collision load applied to the vehicle 100 is transmitted to the vehicle occupant room 105 through various routes including both side members 104, 104 fixed to the both sides of the engine 102, etc. In the FIG. 3A an arrow designates a transmission route of the collision load.

Figure 4:
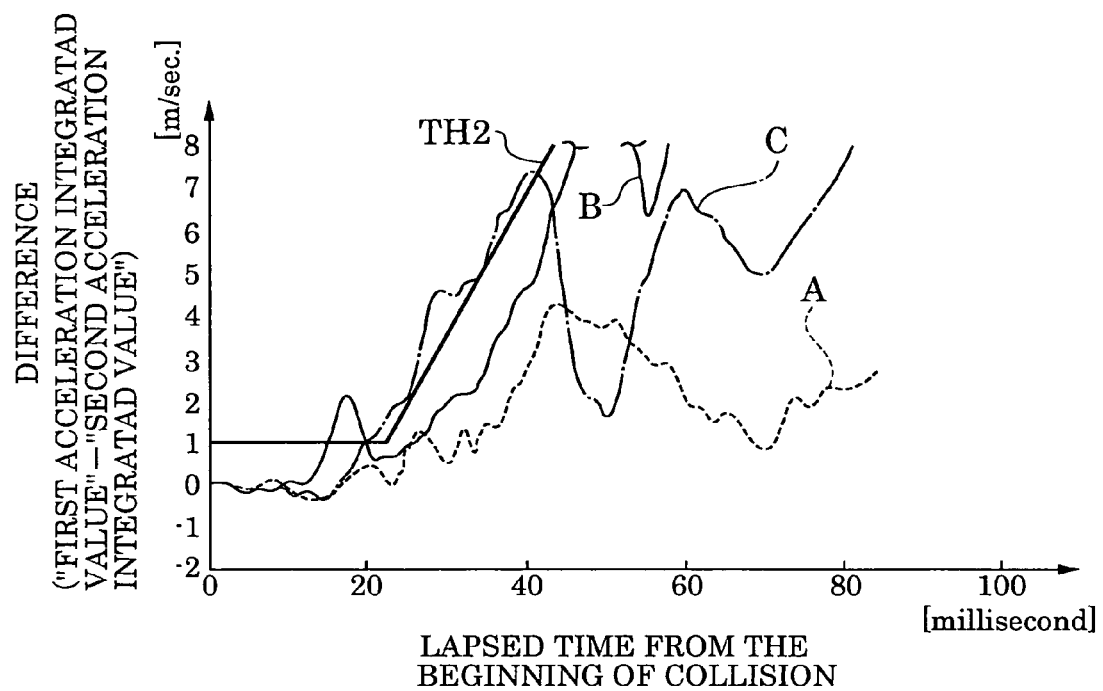
FIG. 4 is a graph for describing an operation of a vehicle occupant protection apparatus of a second embodiment according to the present invention.
Figure 5:
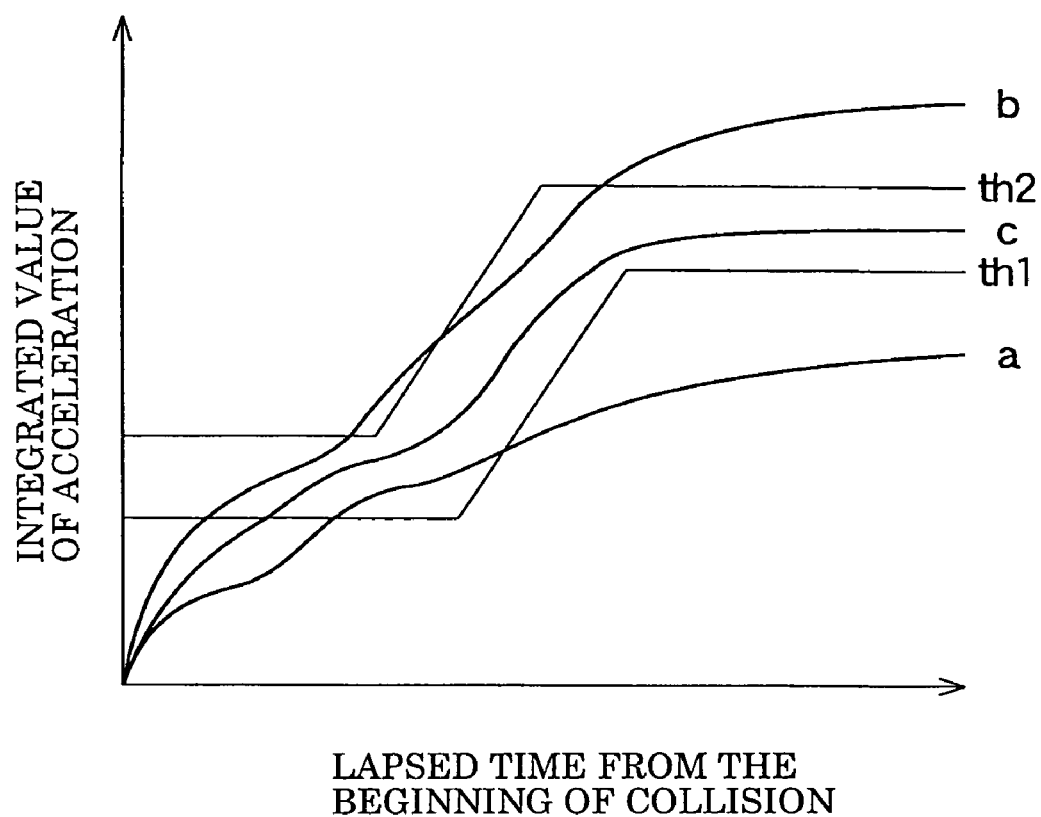
FIG. 5 is a graph for describing a problem of a conventional vehicle occupant protection apparatus.

Thus, the damping amount of acceleration caused by the transmission from the first acceleration sensor 2 to the second acceleration sensor 3 (i.e. the difference 18*a*) becomes relatively small, and, as indicated with the symbol A in FIG. 4, the difference 18*a* does not exceed the second initiation threshold value TH2 from the time the collision occurred until a lapse of 30 milliseconds.

Thus, in the case where a head-on collision occurs at a low velocity, although produced acceleration in the beginning of the collision is great, the second initiation command 22*a* is not outputted from the second initiation determination device and therefore the airbag can be half unfolded.

In the next case where the vehicle 100 causes an offset collision with a barrier at a high velocity, e.g. a collision with an aluminum barrier (honeycomb structural wall made with aluminum) 107 at 64 kilometer/hour having a 40% striking area of the vehicle 100's surface, as shown in FIG. 3A, the front surface anterior to the left side seat of the vehicle 100 strikes the aluminum barrier 107.

In this case, since the collision area on the vehicle 100 is small, the collision load applied to the vehicle 100 is transmitted to the vehicle occupant room 105 through limited routes such as only one of the side members 104, 104 fixed to the both sides of the engine 102, etc. In the FIG. 3B an arrow designates a transmission route of the collision load.

Thus, the damping amount of acceleration caused by the transmission from the first acceleration sensor 2 to the second acceleration sensor 3 (i.e. the difference 18*a*) becomes relatively great, and, as indicated with the symbol B in FIG. 4, the difference 18*a* exceeds the second initiation threshold value TH2 by a lapse of 30 milliseconds from the time the collision occurred.

Thus, in the case where the vehicle 100 causes an offset collision at a high velocity, although produced acceleration in the beginning of the collision is small, the second initiation command 22*a* can be outputted from the second initiation determination device 23 within a short time like 30 milliseconds from the collision occurrence and therefore the airbag can be fully unfolded.

In the case where the vehicle 100 collides obliquely with a barrier (a rigid wall made with concrete) 106 at a high velocity, e.g. 48 kilometer/hour, as shown in FIG. 3C, the front surface anterior to the left side seat of the vehicle 100 strikes the barrier 106 because the barrier 106 is placed obliquely.

In this case, since the collision area on the vehicle 100 is small, the collision load applied to the vehicle 100 is transmitted to the vehicle occupant room 105 through limited routes such as only one of the side members 104, 104 fixed to the both sides of the engine 102, etc. In the FIG. 3C an arrow designates a transmission route of the collision load.

Thus, the damping amount of acceleration caused by the transmission from the first acceleration sensor 2 to the second acceleration sensor 3 (i.e. the difference 18*a*) becomes relatively great, and, as indicated with the symbol C in FIG. 4, the difference 18*a* exceeds the second initiation threshold value TH2 by a lapse of 30 milliseconds from the time the collision occurred.

Thus, in the case where the vehicle 100 collides obliquely with a barrier 106 at a high velocity, although produced acceleration in the beginning of the collision is small, the second initiation command 22*a* can be outputted from the second initiation determination device 23 within a short time like 30 milliseconds from the collision occurrence and therefore the airbag can be fully unfolded.

Thus, by outputting the second initiation command based on a comparison result of the difference 18*a* with the second initiation threshold value TH2, it can be surely determined which collision is occurring, a low velocity head-on collision which produces relatively low impact, where the second inflator 62 is not necessarily initiated or a high velocity offset/oblique collision which produces relatively high impact, where the second inflator 62 need be initiated.

Further, the second inflator 62 can be initiated at proper timing in response to a type of an occurring vehicle collision, and thus the airbag can be fully unfolded at proper timing.

As described above, according to the unfolding judgment method for the vehicle occupant protection apparatus 1 of the present invention, a first acceleration integrated value 16*a* is obtained by taking the time integral of acceleration in the vehicle 100's longitudinal direction detected with the first acceleration sensor 2 attached to the anterior portion of the vehicle 100, and a second acceleration integrated value 17*a* is obtained by taking the time integral of acceleration in the vehicle 100's longitudinal direction detected with the second acceleration sensor 3 attached to the substantially central portion of the vehicle 100, and then the airbag (not shown) is unfolded after judging a collision type using the difference between the first acceleration integrated value 16*a* and the second acceleration integrated value 17*a*.

By so doing, a collision type can be properly judged by using a damping amount of acceleration which indicates how much amount of acceleration is reduced within transmission of a collision impact between the first acceleration sensor 2 and the second acceleration sensor 3. Thus, the airbag can be half unfolded or fully unfolded according to a type of collision.

The vehicle occupant protection apparatus 1 according to the second embodiment of the present invention is provided with the first acceleration sensor 2, attached to the front portion of the vehicle 10, for detecting acceleration in the vehicle 10's longitudinal direction; the second acceleration sensor 3, attached anterior to the position to which the first sensor 2 is attached in the vehicle 10's longitudinal direction, for detecting acceleration in the vehicle 10's longitudinal direction; the integral initiation control device 15 for issuing an integral initiation command at the time acceleration detected by the first acceleration sensor 2 exceeds the preset threshold value for determining whether collision of the vehicle 10 is occurring; the first acceleration integral device 16 for obtaining a first integral acceleration value by taking the time integral of output from the first acceleration sensor 2 based on the integral initiation command; the second acceleration integral device 17 for obtaining a second integral acceleration value by taking the time integral of output from the second acceleration sensor 3 based on the integral initiation command; the subtraction device 18 for subtracting the second integral acceleration value from the first integral acceleration value to obtain a difference thereof; the initiation determination device 20 for comparing the difference to the first threshold value and to the second threshold value, both of which are predetermined in accordance with lapsed time from start time of taking the time integral, to output a first command at the time the difference reaches the first threshold value and a second command at the time the difference reaches the second threshold value; and the airbag driving device 5 for initiating the first inflator 61 of the airbag apparatus 6 based on the first command and initiating the second inflator 62 of the airbag apparatus 6 based on the second command.

The first and second embodiments employ the airbag apparatus as a vehicle occupant protection device. However, the vehicle occupant protection apparatus in accordance with the present invention can be applicable to control over a vehicle occupant protection device (e.g. a seat belt pretensioner device) desired to be variously operated in accordance with a collision type.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A vehicle occupant protection apparatus, comprising:
   a first acceleration sensor, attached to a front portion of a vehicle, for detecting acceleration in the vehicle's longitudinal direction;
   a second acceleration sensor, attached to a substantially central portion in the vehicle's longitudinal direction, for detecting acceleration in the vehicle's longitudinal direction;
   an integral initiation control device for issuing an integral initiation command at the time acceleration detected by the first acceleration sensor exceeds a preset threshold value for determining whether a collision of the vehicle is occurring;
   a first acceleration integral device for obtaining a first integral acceleration value by taking the time integral of acceleration detected by the first acceleration sensor based on the integral initiation command from the integral initiation control device;
   a second acceleration integral device for obtaining a second integral by the second acceleration sensor based on the integral initiation command from the integral initiation control device;
   a subtraction device for calculating a difference between the first integral acceleration value and the second integral acceleration value; and
   an initiation determining device for determining a type of the collision using the difference calculated by the subtraction device and starting an operation of a vehicle protection device for protecting a vehicle occupant of the vehicle based on the determined type of the collision.

2. The vehicle occupant protection apparatus according to claim 1, wherein the vehicle protection device is an airbag apparatus.

3. The vehicle occupant protection apparatus according to claim 1, wherein the front portion of the vehicle to which the first acceleration sensor is attached is located anterior to an occupant room of the vehicle.

4. The vehicle occupant protection apparatus according to claim 1, wherein the substantially central portion in the longitudinal direction of the vehicle to which the second acceleration sensor is attached is located in an occupant room area of the vehicle.

5. The vehicle occupant protection apparatus according to claim 1, wherein the first acceleration sensor and/or the second acceleration sensor is located in a substantially central portion in a lateral direction of the vehicle.

6. A vehicle occupant protection apparatus, comprising:
   a first acceleration sensor, attached to a front portion of a vehicle, for detecting acceleration in the vehicle's longitudinal direction;
   a second acceleration sensor, attached to a position which is closer to a center in the vehicle's longitudinal direction than the front portion to which the first sensor is attached, for detecting acceleration in the vehicle's longitudinal direction;
   an integral initiation control device for issuing an integral initiation command at the time acceleration detected by the first acceleration sensor exceeds a present threshold value for determining whether collision of the vehicle is occurring;
   a first acceleration integral device for obtaining a first integral acceleration value by taking the time integral of output from the first acceleration sensor based on the integral initiation command;
   a second acceleration integral device for obtaining a second integral acceleration value by taking the time integral of output from the second acceleration sensor based on the integral initiation command;
   a subtraction device for receiving the first integral acceleration value and the second integral acceleration value and for subtracting the second integral acceleration value from the first integral acceleration value to obtain a difference thereof;
   an initiation determination device for comparing the difference to a first threshold value and to a second threshold value, both of which are predetermined in accordance with lapsed time from start time of taking time integral, to output a first command at the time the difference reaches the first threshold value and a second command at the time the difference reaches the second threshold value; and
   an airbag driving device for initiating a first inflator of an airbag apparatus based on the first command and initiating a second inflator of the airbag apparatus based on the second command.

7. The vehicle occupant protection apparatus according to claim 6, wherein the front portion of the vehicle to which the first acceleration sensor is attached is located anterior to an occupant room of the vehicle.

8. The vehicle occupant protection apparatus according to claim 6, wherein the position to which the second sensor is attached is located in an occupant room area of the vehicle.

9. The vehicle occupant protection apparatus according to claim 6, wherein the first acceleration sensor and/or the second acceleration sensor is located in a substantially center in a lateral direction of the vehicle.

10. A computerized method for initiating a vehicle occupant protection apparatus, comprising the steps of:

obtaining and storing, in a storage device inherent in a computerized system, a first integral acceleration value by taking the time integral of acceleration in a longitudinal direction of a vehicle detected with a first acceleration sensor attached to a front portion of the vehicle;

obtaining and storing, in a storage device inherent in a computerized system, a second integral acceleration value by taking the time integral of acceleration in the longitudinal direction of the vehicle detected with a second acceleration sensor attached to a portion closer to the vehicle's center in the longitudinal direction than the front position to which the first acceleration sensor is attached;

determining a type of a collision of the vehicle by using comparing the stored first integral acceleration value and the second integral acceleration value; and initiating a vehicle occupant protection device for protecting an occupant of the vehicle based on the determined type of the collision.

11. The method for initiating a vehicle occupant protection apparatus according to claim 6, wherein the vehicle occupant protection device is an airbag apparatus.

* * * * *